March 28, 1961  R. J. WICKMAN ET AL  2,976,642
FISH LINE SUBMERGING DEVICE
Filed Jan. 15, 1960
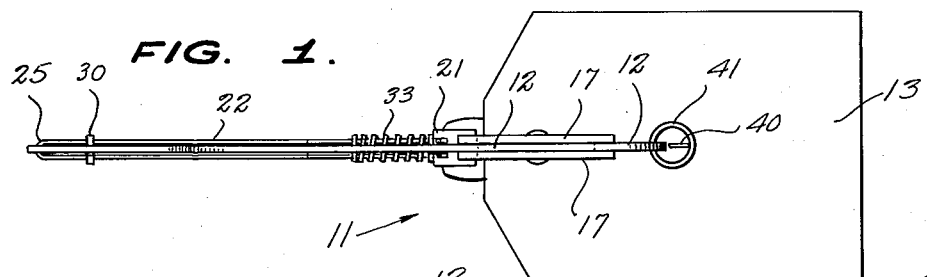
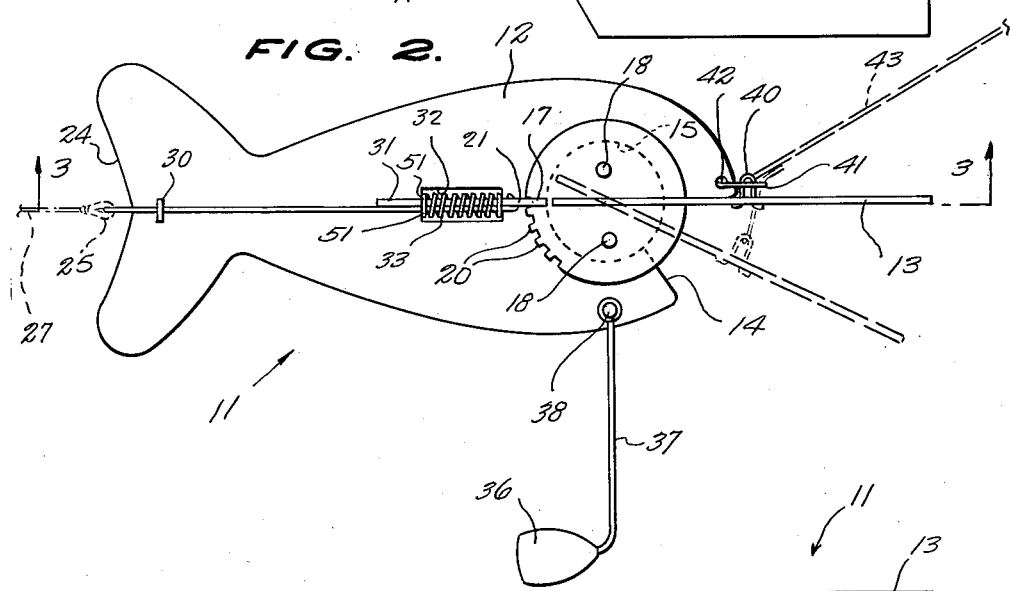
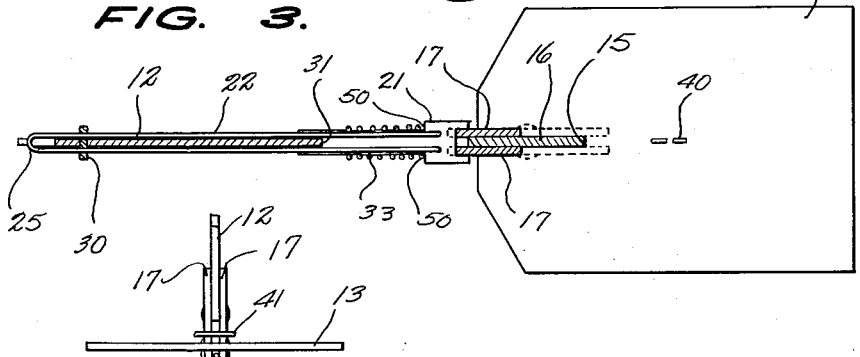
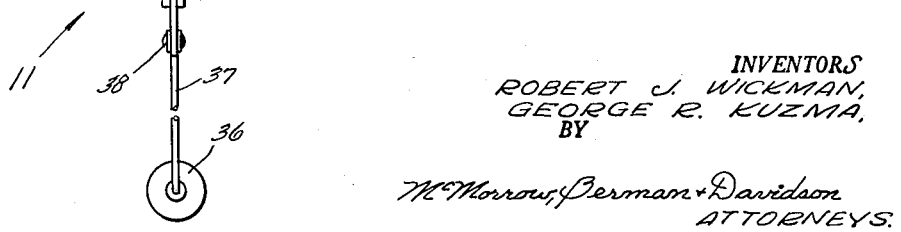
INVENTORS
ROBERT J. WICKMAN,
GEORGE R. KUZMA,
BY
McMorrow, Berman & Davidson
ATTORNEYS.

2,976,642

FISH LINE SUBMERGING DEVICE

Robert J. Wickman, 719 Kadota Ave., and George R. Kuzma, 1545 Spruce Ave., both of Atwater, Calif.

Filed Jan. 15, 1960, Ser. No. 2,777

4 Claims. (Cl. 43—43.13)

This invention relates to fishermen's equipment, and more particularly to a device for causing a fishing lure to be submerged to a desired depth by the reaction of moving water, rather than by the force of gravity exerted thereon by a weight or sinker.

A main object of the invention is to provide a novel and improved fish line submerging device which is simple in construction, which may be easily adjusted to hold a fishing lure or similar fish hook carrying member at a desired depth, and which is especially suitable for use in trolling or fishing from a boat in a fast running stream, river or waterway, as well as being useful for fishing from the bank of a running stream or river.

A further object of the invention is to provide an improved fish line submerging device which is inexpensive to fabricate, which is durable in construction, which is easy to handle, and which is relatively light in weight, being arranged so that it does not require heavy weights or sinkers to be used in association therewith.

A still further object of the invention is to provide an improved adjustable fish line submerging device which takes the place of attractor blades, which is stable in operation so that it does not twist the fishing line, which may be set to provide a desired degree of submersion of the lure or similar fish hook carrying member employed therewith, and which is arranged so that it automatically assumes a neutral condition responsive to the striking of a fish on the associated lure so that it substantially removes resistance to forward movement thereof so that the fisherman may manipulate the line in a normal fashion.

Further objects and advantages of the invention will become apparent from the following description and claims, and from the accompanying drawings, wherein:

Figure 1 is a top plan view of an improved fish line submerging device constructed in accordance with the present invention.

Figure 2 is a side elevational view of the fish line submerging device of Figure 1.

Figure 3 is a horizontal cross sectional view taken on the line 3—3 of Figure 2.

Figure 4 is a front end elevational view of the fish line submerging device of Figures 1, 2 and 3.

Referring to the drawings, 11 generally designates an improved fish line submerging device according to this invention. The device 11 comprises a vertical plate-like main body member 12 which may be suitably contoured, for example, to substantially present the profile of a fish, as illustrated. Designated at 13 is a flat plate-like vane member which may be of any suitable shape, for example, may be of generally rectangular shape as illustrated, the vane member 13 being rotatably secured to the forward end portion of the main body portion 12 perpendicularly thereto for rotation around a horizontal transverse axis. Thus, the plate-like vertical main body member 12 may be formed with a notch 14 which communicates with a generally circular recess 15, the recess 15 and notch 14 opening at the forward end of the member 12 and being downwardly directed. Rigidly secured to the rear end of the vane member 13 perpendicularly thereto is a circular disc member 16 which is rotatably disposed in the circular recess 15 and which is retained therein by a pair of circular disc members 17, 17 concentrically secured thereto at the opposite sides thereof and being substantially larger in diameter than the intermediate disc member 16. Thus, the outer retaining disc members 17, 17 are rigid with the vane member 13 and are perpendicular thereto, being located adjacent the opposite sides of the vertical main body member 12 so as to retain the intermediate disc member 16 in the circular recess, whereby to rotatably connect the vane member 13 to the main body member 12 for rotation around the transverse axis of the disc members 16 and 17, 17.

Suitable transversely extending rivets 18, 18 may be employed to rigidly secure the outer disc members 17, 17 to the intermediate disc member 16.

The disc members 17, 17 are formed with spaced teeth 20 defining retaining notches therebetween, said retaining notches being selectively engageable by a locking plate member 21 which is secured to the ends of the side arms of a U-shaped trigger member 22 which extends longitudinally and which extends around the rear edge 24 of the main body member 12. The bight portion 25 of the trigger member 22 thus projects rearwardly of rear edge 24 and is employed as a connecting means for fastening the flexible leader 27 thereto, the leader 27 being attached to a lure or similar fish hook carrying member. The side arms of the trigger member are slidably supported in the apertured opposite end portions of a transversely extending guide bar 30 secured in the rear end portion of the vertical main plate-like body member 12 and projecting outwardly therefrom, as clearly illustrated in Figure 3. The trigger plate 21 extends transversely through a longitudinal slot 31 formed in the intermediate portion of the plate-like main body member 12, said slot being exposed to the toothed portions 20 of the outer disc members 17, 17 to allow the trigger plate 21 to be lockingly engaged between selected teeth of said disc members. The slot 31 is provided with a rectangular enlarged intermediate portion 32 in which is disposed a coiled spring 33 which surrounds the side arms of the member 22 and which bears between rearwardly facing lateral shoulders 50, 50 on the trigger plate 21 and the rear shoulders 51, 51 defined by the enlarged rectangular opening 32, biasing the trigger plate 21 toward engagement with the peripheries of the discs 17, 17.

The spring 33 is relatively light so that it will yield in response to the pull exerted on the member 22 produced by a fish striking at the lure.

A ballast weight member 36 is rigidly connected to the lower end of a relatively stiff wire 37 which is in turn connected at its top end to the lower forward marginal portion of the plate-like member 12, as by a transversely extending rivet 38, the weight member 36 acting to stabilize the main body portion 12 and to maintain said main body portion substantially in a vertical position in the water.

An upstanding generally U-shaped fastening loop 40 is secured to the intermediate portion of the vane member 13, the member 40 being located so that it is engageable through a ring 41 pivotally connected to the forward end of the main body portion 12, for example, at an aperture 42 provided in the forward end of said main body. A fishing line 43 may be connected to the top portion of the loop 40 extending above the ring 41 in the manner illustrated in Figure 2.

In using the device, the vane 13 may be adjusted to a desired angular position with respect to the horizontal by retracting the member 22 so as to allow the vane 13 to be rotated downwardly, for example, to the dotted view position thereof illustrated in Figure 2. The detent plate 21 will then engage between a pair of adjacent teeth 20 on the disc member 17 and hold the vane 13 in its angularly adjusted position, said position corresponding to the desired depth at which the associated lure is to be maintained. Thus, the action of the moving water engaging on the downwardly and forwardly inclined vane member 13 will depress the device 11 to the desired depth, thus maintaining the lure connected thereto by the leader member 27 at the desired depth. When a fish strikes at the lure, the pull exerted on the member 22 by the leader member 27 will retract the detent plate 21, releasing the disc members 17, 17, and allowing the vane member 13 to assume a neutral position, namely, a position substantially aligned with the longitudinal axis of the member 12, due to the pull of the fishing line which is first led through the ring 41, whereby the vane member 13 will no longer interfere with the normal movement of the lure through the water as the fishing line 43 is reeled in. This allows the fisherman to play the fish in the normal manner without any substantial interference or resistance on the part of the device 11.

As will be readily understood, the angular width of the notch 14 may be sufficient to allow for a wide range of angular adjustment of the vane member 13, and sufficient teeth 20 may be provided on the disc members 17 to allow the vane member to be adjusted to any desired angular position within the limit defined by the angular width of notch 14.

While a specific embodiment of an improved fish line submerging device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A fish line submerging device comprising a vertical plate-like main body member, a flat plate-like vane member rotatably secured to the forward end portion of said main body member perpendicularly thereto for rotation around a horizontal transverse axis, a detent member movably mounted on said main body members rearwardly of said vane member, yieldable means urging said detent member forwardly into locking engagement with said vane member, means to attach a fishing lure to said detent member, whereby a rearward pull on said lure retracts said detent member and releases said vane member, and means to attach a fishing line to said vane member.

2. A fish line submerging device comprising a vertical plate-like main body member, depending weight means secured to the bottom marginal portion of said main body member to bias same towards an upright position, a flat plate-like vane member, means rotatably connecting said vane member perpendicularly to the forward end portion of said main body member for rotation around a horizontal transverse axis, a detent member slidably mounted on said main body member rearwardly of said vane member, yieldable means urging said detent member forwardly into locking engagement with said vane member, means to attach a fishing lure to the rear end portion of said detent member, whereby a rearward pull on said lure retracts said detent member and releases said vane member, and means to attach a fishing line to said vane member.

3. A fish line submerging device comprising a vertical plate-like main body member, depending weight means secured to the bottom marginal portion of said main body member to bias same towards an upright position, a flat plate-like vane member, a toothed disc member secured to the rear end portion of said vane member perpendicularly thereto, means rotatably connecting said disc member to the forward end portion of the main body member for rotation around a horizontal transverse axis, a longitudinally extending detent member slidably mounted on said main body member rearwardly of said disc member, yieldable means urging said detent member forwardly into locking engagement with said disc member, means to attach a fishing lure to the rear end portion of said detent member, whereby a rearward pull on said lure retracts said detent member and releases said vane member, and means to attach a fishing line to said vane member.

4. A fish line submerging device comprising a vertical plate-like main body member, depending stabilizing means secured to the bottom marginal portion of said main body member and biasing same towards an upright position, a flat plate-like vane member, a toothed disc member secured to the rear end portion of said vane member perpendicularly thereto, means rotatably connecting said disc member to the forward end portion of the main body member for rotation around a horizontal transverse axis, a longitudinal extending detent member slidably mounted on said main body member rearwardly of said disc member, yieldable means urging said detent member forwardly into locking engagement with said disc member, means to attach a fishing lure to the rear end portion of said detent member, whereby a rearward pull on said lure retracts said detent member and releases said vane member, a loop element pivoted to the forward end portion of said main body member, and a fishing line extending slidably through said loop element and connected to the intermediate portion of said vane member at a point subjacent said loop member.

References Cited in the file of this patent

UNITED STATES PATENTS

| | | |
|---|---|---|
| 2,234,943 | Nyman | Mar. 11, 1941 |
| 2,776,517 | Borgstrom | Jan. 8, 1957 |
| 2,836,002 | Miller | May 27, 1958 |
| 2,891,345 | Uhlen | June 23, 1959 |